(12) United States Patent
Scott et al.

(10) Patent No.: US 7,758,016 B2
(45) Date of Patent: Jul. 20, 2010

(54) BALL VALVE

(75) Inventors: Gordon Kenneth Scott, Laurencekirk (GB); James Crabb, Arbroath (GB); Ronald George Taylor, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 110 days.

(21) Appl. No.: 11/750,880

(22) Filed: May 18, 2007

(65) Prior Publication Data

US 2007/0278438 A1 Dec. 6, 2007

(30) Foreign Application Priority Data

May 22, 2006 (GB) .................. 0610149.7

(51) Int. Cl.
*F16K 25/00* (2006.01)
(52) U.S. Cl. .................. 251/192; 251/180; 251/176; 251/314; 251/175
(58) Field of Classification Search .......... 251/170, 251/172, 175, 176, 180, 192, 314
See application file for complete search history.

(56) References Cited

U.S. PATENT DOCUMENTS

| | | | |
|---|---|---|---|
| 3,986,699 A | 10/1976 | Wucik, Jr. et al. | |
| 4,280,522 A * | 7/1981 | Pechnyo et al. | 137/72 |
| 4,519,412 A * | 5/1985 | Grazioli | 137/72 |
| 4,557,286 A * | 12/1985 | Nagano | 137/74 |
| 4,936,547 A | 6/1990 | Obst | |
| 5,322,261 A | 6/1994 | Aarnes | |
| 5,338,003 A * | 8/1994 | Beson | 251/172 |
| 5,494,256 A * | 2/1996 | Beson | 251/172 |
| 6,425,570 B1 | 7/2002 | Kemp | |
| 7,032,880 B2 * | 4/2006 | Scaramucci | 251/172 |

FOREIGN PATENT DOCUMENTS

| | | |
|---|---|---|
| GB | 2369383 | 5/2002 |
| GB | 2413619 | 11/2005 |
| WO | WO 9118229 | 11/2005 |

OTHER PUBLICATIONS

Examination report for European patent application No. 07252078.6 dated Apr. 14, 2008.
European Search Report for EP 07252078 dated Jul. 30, 2007.
UK Search Report for GB 0610149 dated Aug. 23, 2006.

* cited by examiner

*Primary Examiner*—John K Fristoe, Jr.
(74) *Attorney, Agent, or Firm*—Marlin R. Smith

(57) ABSTRACT

A ball valve comprising a housing, a ball seat disposed within the housing, and a ball rotatably movable within the housing, and engageable with the ball seat in order to provide a seal within the ball valve and the ball seat, wherein the ball seat comprises multiple seat surfaces independently capable of engaging the ball, a first seat surface engaging the ball to form a first seal, and being arranged such that pressure acting from above pushes the first seat surface against the ball; a second seat surface being movable relative to the first seat surface and engaging the ball to form a second seal, the second seat surface being arranged such that pressure acting from below causes the second seat surface to move relative to the first seat surface and pushes the second seat surface into contact with the ball.

19 Claims, 2 Drawing Sheets

BALL VALVE

CROSS-REFERENCE TO RELATED APPLICATION

The present application claims the benefit under 35 USC §119 of the filing date of United Kingdom application no. GB 0610149.7, filed May 22, 2006, the entire disclosure of which is incorporated herein by this reference.

BACKGROUND

The present invention relates to a ball valve. More particularly, the present invention relates to a ball valve with a dual seat arrangement which is effective at maintaining a seal when pressure is acting from above and/or below the system.

A number of oilfield operations involve the use of apparatus which includes a ball valve. A ball valve generally includes a ball seat for receiving a sealing ball. Such operations include subsurface flow control operations, completions and interventions.

Once a ball valve is closed by the seating of the ball on the ball seat, it is essential that an effective seal is maintained. This is particularly important when the ball valve is subjected to high downhole temperatures and high downhole pressures. Prior art sealing systems for ball valves, such as that disclosed in U.S. Pat. No. 5,865,246, use a single point to provide sealing and may not provide consistent sealing results.

A sealing system described below provides more consistent sealing, particularly at high temperatures and pressures, by the use of a dual seal arrangement situated above and/or below the ball to effect sealing from pressure acting both above and below a ball of the system. The ball maintains a consistent seal regardless of whether pressure is applied from above the ball, below the ball or from both above and below the ball. Thus, the dual seal arrangement of the system described below provides a reliable, bidirectional seal point which is particularly suitable for use in apparatus which is located in a high temperature, high pressure environment.

The system described below may be used in conventional ball valves, particularly ball valves such as the LV lubricator valve, the FSI fluid loss device and the IB series of fluid loss devices, all manufactured by Halliburton Energy Services, Inc.

SUMMARY

Described herein is a ball valve which provides improved sealing. The ball valve has a ball and a dual ball seat arrangement, such that the ball seat arrangement provides two points of sealing against the ball. This dual seal feature allows for primary and secondary sealing of the ball when pressure is applied from above, below or both above and below. When pressure is acting from above only, a primary seal is created at a first point. At the second point, the seat is closely positioned or in contact with the ball. When pressure is acting from above and below, both points on the seat are in contact with the ball.

According to a first aspect, there is provided a ball valve comprising a housing, a ball seat disposed within the housing, and a ball rotatably movable within the housing, and engageable with the ball seat in order to provide a seal within the ball valve and the ball seat, wherein the ball seat comprises a first seat surface and a second seat surface, each seat surface being independently capable of engaging the ball, the first seat surface being capable of engaging the ball to form a first seal, and being arranged such that pressure acting from above pushes the first seat surface against the ball; the second seat surface being movable relative to the first seat surface and being capable of engaging the ball to form a second seal, the second seat surface being arranged such that pressure acting from below causes the second seat surface to move relative to the first seat surface and pushes the second seat surface into contact with the ball.

In an embodiment, the ball and the first seat surface are metal, whereby a metal to metal seal is formed between the ball and the first seat surface.

In an embodiment, the ball and the second seat surface are metal, whereby a metal to metal seal is formed between the ball and the second seat surface.

In another embodiment, one or both of the first seat surface and the second seat surface comprises a sharp contact, a spherical sealing, or a lapped surface.

In another embodiment, the first seat surface is provided on a first seat member and the second seat surface is provided on a second seat member. The second seat member may be movable relative to the housing.

In an embodiment, one or both of the first seat and second seat members is flexible.

The valve may further comprise an insert positioned between the first and second seat members.

In an embodiment, the insert is non-elastomeric. In another embodiment, the insert is non-metallic.

In an embodiment, a first surface of the insert abuts the ball and a second surface of the insert abuts an upwardly-extending shoulder formed by the second seat member.

In another embodiment, a part of the first seat member is in slidable contact with a part of the second seat member.

The valve may further comprise a seal between the first seat member and the second seat member.

In an embodiment, the valve further comprises a spacer ring arranged in a recess between the first seat member and the second seat member, the spacer ring being arranged so as to closely position the second seat surface against the ball. In an alternative embodiment, the valve further comprises a biasing means arranged to bias the second seat member to a position in which it is out of contact with the ball. In another alternative embodiment, the valve further comprises a biasing means arranged to bias the second seat member to a position in which it is in contact with the ball.

In an embodiment, the valve further comprises a biasing means arranged to bias the first seat member to a position in which it is in contact with the ball.

In a further embodiment, the first seat surface and the second seat surface are positioned on the same hemisphere of the ball.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

BRIEF DESCRIPTION OF THE DRAWINGS

The accompanying drawings are incorporated into and form a part of the specification to illustrate several examples of the present invention. These drawings together with the description serve to explain certain non-limiting principles of the invention. The drawings are only for the purpose of illustrating examples of how the invention can be made and used and are not to be construed as limiting the invention to only the illustrated and described examples. The various advantages and features of embodiments of the present invention will be apparent from a consideration of the drawings in which.

DETAILED DESCRIPTION

Figure 1:
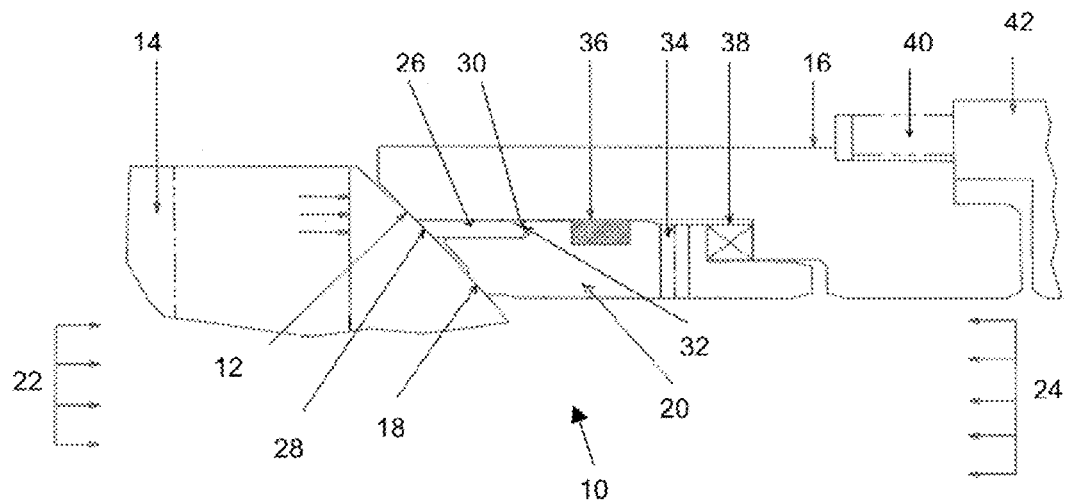
FIG. 1—is a schematic cross sectional view of a first embodiment of a ball valve embodying principles of the present invention.

The drawings show one or more examples of how exemplary embodiments of the invention can be made and used. In these drawings, reference characters are used throughout the several views to indicate like or corresponding parts. In the description which follows, like or corresponding parts may be marked throughout the specification and drawings with the same reference numerals, respectively. The drawings are not necessarily to scale and the proportions of certain parts have been exaggerated to better illustrate details and features of the invention.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

References to pressure acting from above refer to pressure acting from the top of a wellbore in a downhole direction, and references to pressure acting from below refer to pressure acting from the bottom of a wellbore in an uphole direction.

In the Figures, the ball valve is shown in a position in which it is rotated 90° counter-clockwise relative to its position in a vertical wellbore. Thus, the top of the wellbore is in the direction of the left hand side of the Figures, and the bottom of the wellbore is in the direction of the right hand side of the Figures.

FIG. 1 shows an embodiment of the ball valve (10) in which a first seat surface (12) is formed between a ball (14) and a first metal seat surface on a first seat member (16), and a second seat surface (18) is formed between the ball (14) and a second metal seat surface on a second seat member (20).

The first seat surface (12) provides primary sealing when pressure is applied from above (see arrows 22). The natural flexing effects of the ball (14) and the first seat member (16) when under external pressure add to the sealing effect. When a flexible first seat member (16) is used, the flexibility also adds to the sealing effect. The second seat member (20) provides secondary sealing when pressure is applied from above.

The second seat surface (18) provides primary sealing when pressure is applied from below (see arrows 24). The second seat member (20) may move towards and away from the ball (14).

An insert (26), such as a seal, is positioned between the first seat member (16) and the second seat member (20). The insert (26) aids low pressure gas testing during assembly and reduces ball/seat contact friction.

When the insert (26) is present and pressure is acting from below, the second seat member (20) acts as a primary seal, the first seat member (16) acts as a secondary seal and the insert (26) provides tertiary sealing.

When pressure is acting from below and the insert (26) is not present, the second seat member (20) acts as a primary seal and the first seat member (16) provides secondary sealing.

A front surface (28) of the insert (26) abuts the ball (14) when pressure is acting from below and a rear surface (30) of the insert (26) abuts an upwardly-extending shoulder (32) formed by the second seat (20). The upwardly-extending shoulder (32) of the second seat (20) has a good surface finish to aid pressure sealing at the rear surface (30) of the insert (26).

The insert (26) is preferably non-elastomeric and non-metallic, and may be made of any suitable material, such as plastic.

One or more by-pass ports (34) run radially through a portion of the second seat member (20) and aid the pressure boost effect. A portion of an inner surface of the first seat member (16) is in contact with a portion of an outer surface of the second seat member (20). A seal (36), for example an O-ring, is provided between the inner surface of the first seat member (16) and the outer surface of the second seat member (20). A piston effect is created between the sealing diameter which the seal (36) seals against and the ball (14), and assists with high pressure sealing capability when pressure is applied from below (24).

In the embodiment of FIG. 1, a spacer ring (38) is positioned between a portion of an inner surface of the first seat member (16) and a portion of an outer surface of the second seat member (20) to closely position the second seat member (20) against the ball (14). When there is no pressure acting from below, the second seat surface (18) may or may not be in contact with the ball (14). When pressure is acting from below (24), the pressure is always tending to push the second seat surface (18) against the ball (14).

The contact between the ball (14) and the seat surfaces (12, 18) may be of any type known in the art. For example, the contact may arise from the metal seat being flexible, or the contact may comprise a sharp contact, spherical seal or a lapped surface.

A biasing means (40), such as a spring, may be situated behind a rear surface of the first seat member (16). This provides a constant pre-load on the first seat member (16) and the ball (14), thus providing a biasing force to urge the first seat surface into contact with the ball (14). A bottom sub (42) connects the ball seat to the rest of the ball valve (not shown).

Figure 2:
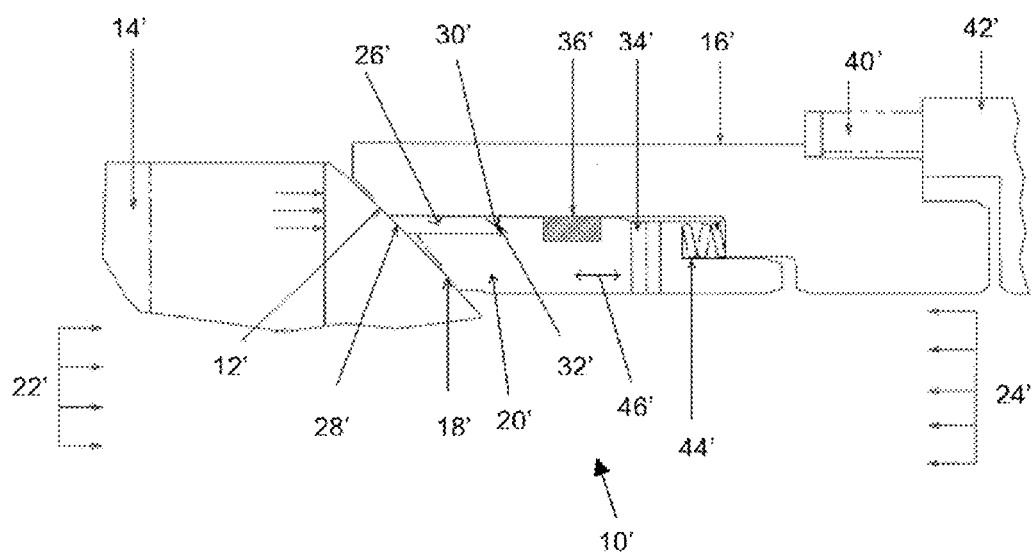
FIG. 2—is a schematic cross sectional view of a second embodiment of a ball valve embodying principles of the present invention.

FIG. 2 shows an alternative embodiment of the ball seat system (10') to that of FIG. 1. All features of the ball seat system (10') of FIG. 2 are identical to those of FIG. 1, except that the spacer ring (38) of FIG. 1 is replaced with a biasing means, such as a spring device (44').

The spring force of spring device (44') keeps the second seat member (20') against the ball (14'). The spring device (44') also allows the second seat member (20') to float away (46') from the ball (14') when subjected to pressure from above (22').

Thus, the second seat (20') is free to move in a plane perpendicular to the longitudinal central axis of the ball (14'). This floating of the second seat member (20') aids the first seat member (16') in contacting the ball (14') without any interference from the second seat member (20').

When pressure is acting from below (24'), the force generated by the pressure pushes the second seat surface (18')

against the ball (14'). The spring device (44') assists in generating the initial seal required to create this force.

Ball valves 10 and 10' are shown in FIGS. 1 and 2, respectively, as being positioned such that the first and second seat members 16 and 20 act on the lower side of a ball. In an alternative embodiment, the first and second seat members 16 and 20 could be positioned so as to act on the upper side of a ball. In a further embodiment, the first and second seat members 16 and 20 could be positioned so as to act on both the upper and lower sides of a ball.

Figure 3:
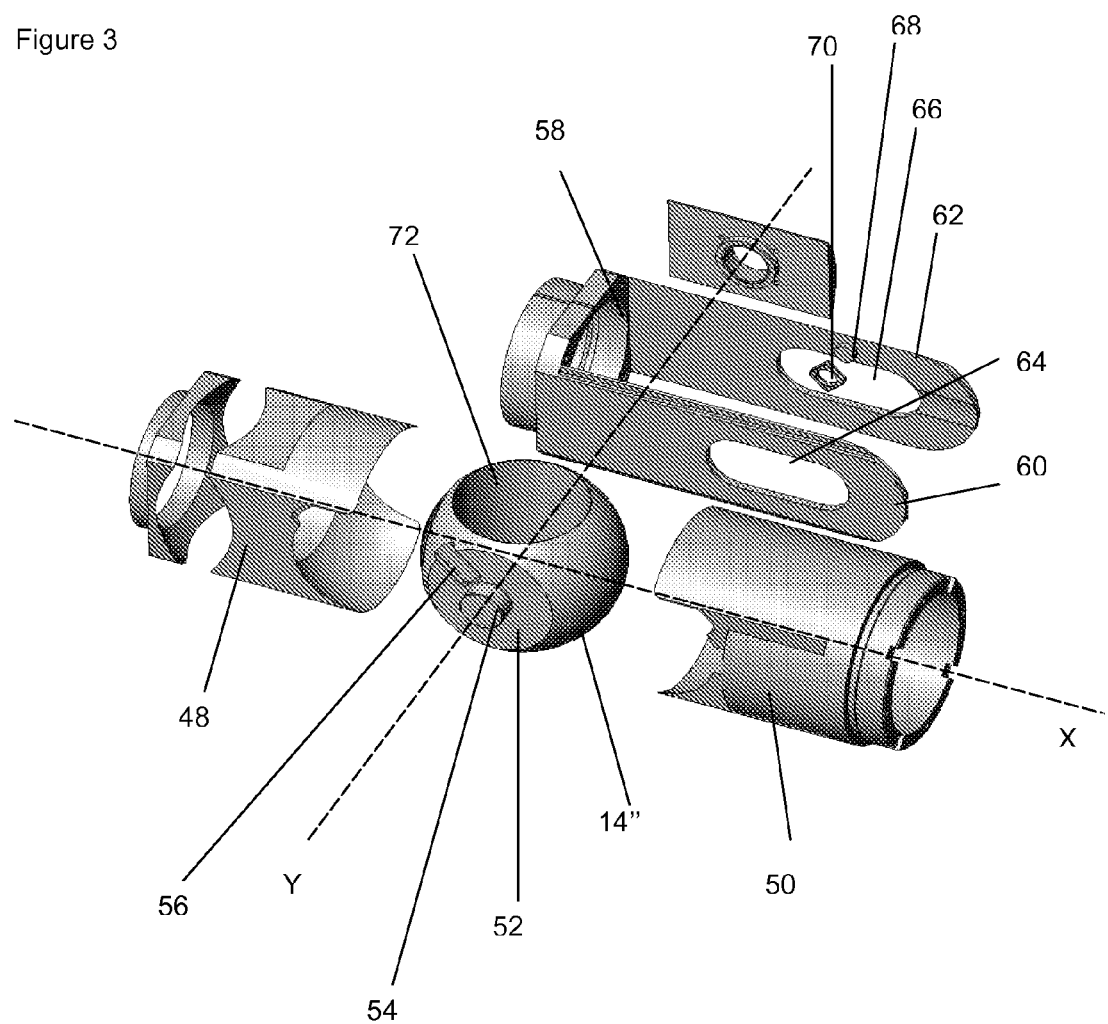
FIG. 3—is a schematic of an embodiment of the ball mechanism embodying principles of the present invention.

FIG. 3 illustrates the components of an embodiment of the mechanism used to move the ball between an open and closed position. The mechanism comprises two cylindrical retaining members (48, 50) on opposite sides of the ball (14"). The ball (14") is a truncated sphere having planar surfaces (52) on opposite sides of the sphere. Only one of the planar surfaces (52) is visible in the FIG. 3.

Planar surfaces (52) each have a cylindrical projection (54) extending outwardly therefrom, and a radial groove (56) from the projection (54).

An actuation member (58) having two arms (60, 62) is positioned over the top of both the ball (14") and the retaining members (48, 50). The actuation member (58) is aligned such that arms (60, 62) are in a plane parallel to that of planar surfaces (52). Projections (54) are received in windows (64, 66) through each of the arms (60, 62).

Actuation pins (68) are provided on each of the inner sides of the arms (60, 62). Pins (68) are received within the grooves (56) on the ball (14"). Bearings (70) are positioned between each pin (68) and groove (56).

In the open position, planar surfaces (56) are positioned so as to allow flow of fluid through a fluid passageway (72) extending through the ball valve. During operation, the ball (14") is rotated about rotational axis Y such that passageway (72) is rotated out of alignment with the flow of fluid, in order to close the valve.

The ball (14") is rotated by linear movement of the actuation member (58) along plane X. The pins (68) move as the actuation member (58) moves, which causes the ball (14") to rotate due to the positioning of the pins (68) within the grooves (56) on the ball (14").

The embodiments shown and described above are only exemplary. Many details are often found in the art such as the other features of a ball valve and downhole tools incorporating a ball valve. Therefore, many such details are neither shown nor described. Even though numerous characteristics and advantages of the present inventions have been set forth in the foregoing description, together with details of the structure and function of the invention, the disclosure is illustrative only, and changes may be made in the detail, especially in matters of shape, size and arrangement of the parts within the principles of the inventions to the full extent indicated by the broad general meaning of the terms used in the attached claims. It will therefore be appreciated that the embodiments of the invention described above may be modified within the scope of the appended claims.

What is claimed is:

1. A ball valve, comprising:
a ball which is rotatably mounted; and
a ball seat which engages a side of the ball,
wherein the ball seat comprises a first seat surface and a second seat surface, the first seat surface sealingly engaging the ball and forming a first primary seal which in conjunction with the ball prevents flow through the valve when pressure is applied to a first side of the valve, the second seat surface being movable relative to the first seat surface and sealingly engaging the ball and forming a second primary seal which in conjunction with the ball prevents flow through the valve when pressure is applied to a second side of the valve opposite the first side.

2. The valve of claim 1, wherein the first primary seal comprises a metal to metal seal.

3. The valve of claim 1, wherein the second primary seal comprises a metal to metal seal.

4. The valve of claim 1, wherein at least one of the first and second seat surfaces comprises a selected one of a sharp contact, a spherical surface, and a lapped surface.

5. The valve of claim 1, wherein the first seat surface is provided on a first seat member and the second seat surface is provided on a second seat member.

6. The valve of claim 5, further comprising an insert positioned between the first and second seat members, the insert having a third seat surface capable of engaging the ball to form a third seal.

7. The valve of claim 6, wherein the insert is non-elastomeric.

8. The valve of claim 6, wherein the insert is non-metallic.

9. The valve of claim 6, wherein the insert engages and displaces with the second seat member.

10. The valve of claim 5, further comprising a sealing engagement between the first seat member and the second seat member.

11. The valve of claim 5, further comprising a spacer ring arranged in a recess between the first seat member and the second seat member, the spacer ring being arranged so as to closely position the second seat surface against the ball.

12. The valve of claim 5, further comprising a biasing device arranged to bias the second seat member to a position in which it is in contact with the ball.

13. The valve of claim 5, further comprising a biasing device arranged to bias the first seat member to a position in which it is in contact with the ball.

14. The valve of claim 1, wherein the second seat surface is positioned within the first seat surface.

15. A ball valve, comprising:
a rotatable ball; and
a ball seat including first and second seat members comprising respective first and second seat surfaces which simultaneously sealingly engage the ball, the second seat member being positioned within and sealingly engaging the first seat member, and the first and second seat members being displaceable relative to each other,
wherein pressure applied to one side of the valve is simultaneously applied to the first and second seat members thereby pushing the first and second seat surfaces against the ball.

16. The valve of claim 15, wherein a first biasing device biases the first seat surface into contact with the ball, and wherein a second biasing device biases the second seat surface into contact with the ball.

17. A ball valve, comprising:
a rotatable ball;
a ball seat including first and second seat members comprising respective first and second seat surfaces which simultaneously sealingly engage the ball, the second seat member being positioned within the first seat member, and the first and second seat members being displaceable relative to each other; and
a third seat surface positioned between the first and second seat surfaces, the third seat surface sealingly engaging the ball, wherein pressure applied to one side of the valve is simultaneously applied to the first and second seat members thereby pushing the first and second seat surfaces against the ball.

18. The valve of claim 15, further comprising a piston area formed between the second seat surface and a seal, so that pressure applied internally to the second seat surface increasingly biases the second seat surface into contact with the ball.

19. The valve of claim 15, wherein a metal to metal seal is formed between the ball and each of the first and second seat surfaces.

* * * * *